(12) United States Patent  
Davis, Jr. et al.

(10) Patent No.: US 6,685,555 B1  
(45) Date of Patent: Feb. 3, 2004

(54) CLIMATE CONTROL SYSTEM OUTLET

(75) Inventors: Joseph J. Davis, Jr., Ortonville, MI (US); Jack S. Palazzolo, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/241,098

(22) Filed: Sep. 11, 2002

(Under 37 CFR 1.47)

(51) Int. Cl.$^7$ .................................................. B60H 1/34
(52) U.S. Cl. ....................................... 454/155; 454/319
(58) Field of Search .................................. 454/155, 314, 454/315, 318, 319, 320

(56) References Cited

U.S. PATENT DOCUMENTS

| | | |
|---|---|---|
| 5,176,571 A | 1/1993 | Fujihara et al. |
| 5,364,303 A | 11/1994 | Terry |
| 5,393,262 A | 2/1995 | Hashimoto et al. |
| 5,470,276 A | 11/1995 | Burnell et al. |
| 5,586,935 A | 12/1996 | Kotoh et al. |
| 5,591,079 A | 1/1997 | Saida |
| 5,626,517 A | 5/1997 | Kil |
| 5,690,550 A | 11/1997 | Mikowski |
| 5,797,792 A | 8/1998 | Kotoh et al. |
| 5,833,532 A | 11/1998 | Kotoh et al. |
| 5,839,953 A | 11/1998 | Kotoh et al. |
| 5,921,861 A | 7/1999 | Yoon |
| 6,059,021 A | 5/2000 | Choi |
| 6,059,654 A | 5/2000 | Kim |
| 6,113,487 A | 9/2000 | Kim |
| 6,135,879 A | 10/2000 | Kohlbach et al. |
| 6,206,777 B1 | 3/2001 | Eriksson et al. |
| 6,454,645 B1 * | 9/2002 | Baba et al. ............... 454/155 |

* cited by examiner

Primary Examiner—Harold Joyce
(74) Attorney, Agent, or Firm—Bill C. Panagos

(57) ABSTRACT

An outlet for a climate control system includes a support member and multiple vanes pivotally connected to the support member. The outlet also includes a link attached to the vanes such that the vanes are pivotable in unison. Furthermore, the link comprises a soft, rubbery material having a Shore A hardness in the range of 40 to 80.

12 Claims, 2 Drawing Sheets

CLIMATE CONTROL SYSTEM OUTLET

BACKGROUND OF THE INVENTION

1. Field of the Invention

The invention relates to a climate control system outlet having a link that is connected to multiple vanes for pivoting the vanes in unison.

2. Background Art

A prior climate control system outlet includes a housing and multiple injection molded plastic vanes pivotally connected to the housing. The outlet further includes one or more injection molded, hard plastic links attached to the vanes for moving the vanes in unison. Each link has multiple pairs of legs, and each pair of legs is configured to snap fit onto a pin of a particular vane. Because of variances in vane and link dimensions that result from associated manufacturing processes, it is difficult to achieve a proper fit between the vanes and links to thereby obtain a desired operational effort for the outlet.

SUMMARY OF THE INVENTION

In accordance with the invention, an outlet for a climate control system includes a support member and multiple vanes pivotally connected to the support member. The outlet also includes a link attached to the vanes such that the vanes are pivotable in unison. Furthermore, the link comprises a soft, rubbery material having a Shore A hardness in the range of 40 to 80.

These and other aspects, features and advantages of the invention are readily apparent from the following detailed description of the preferred embodiments.

DETAILED DESCRIPTION OF THE PREFERRED EMBODIMENT(S)

Figure 1:
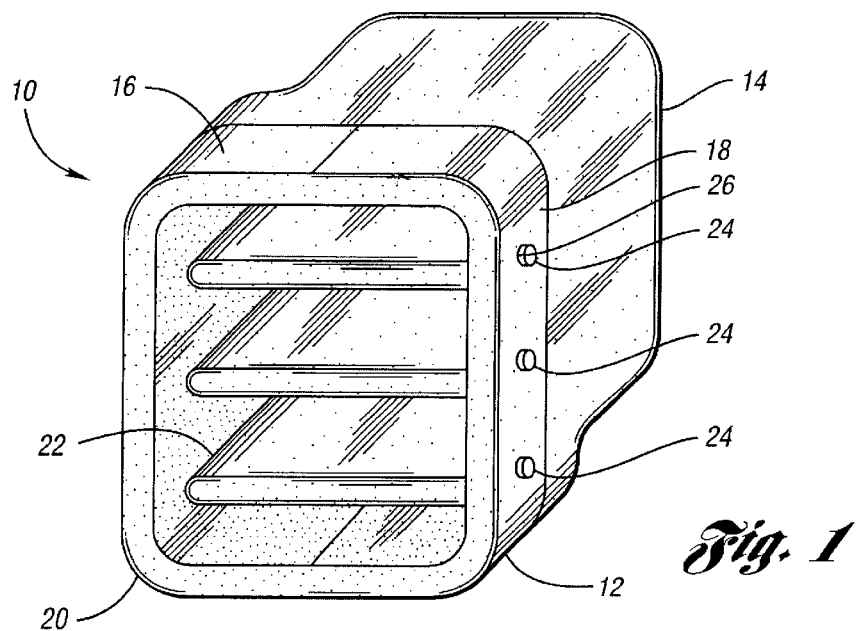
FIG. 1 is a perspective view of an air vent or outlet according to the invention for use with a climate control system.
Figure 2:
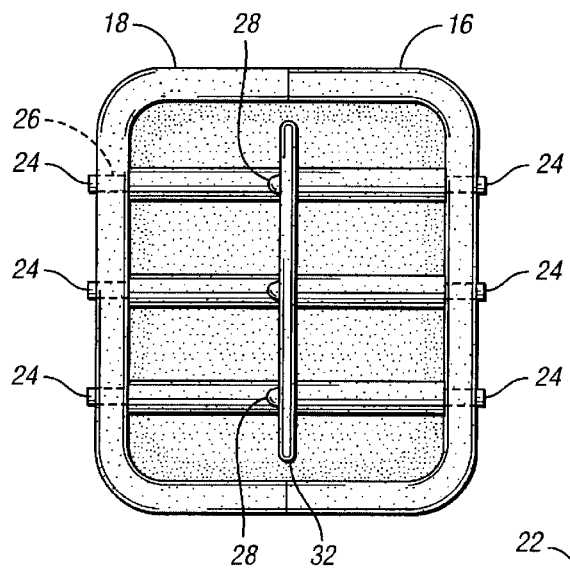
FIG. 2 is a rear view of the outlet showing multiple vanes pivotally connected to a housing, and a link attached to the vanes for pivoting the vanes in unison.
Figure 3:
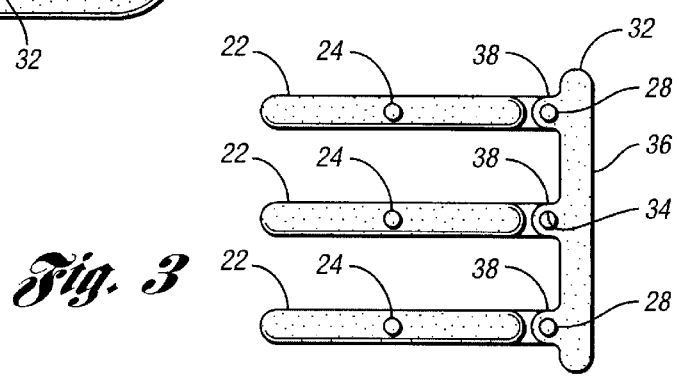
FIG. 3 is a side view of the vanes and link.
Figure 4:
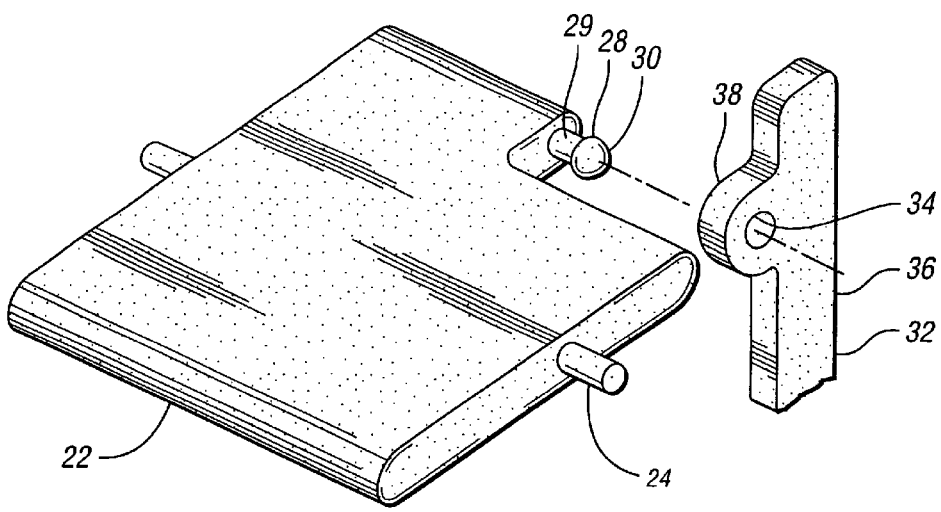
FIG. 4 is an exploded perspective view of one of the vanes and a top portion of the link.

FIG. 1 shows an air vent or outlet 10 according to the invention for use with a climate control system, such as a heating, ventilating and/or air conditioning system (not shown), of a motor vehicle. Alternatively, the outlet 10 may be used with any suitable climate control system, such as a climate control system of a commercial or residential building.

The outlet 10 includes a support member, such as a frame or housing 12, that is attachable to an air passage 14 of the climate control system. While the housing 12 may have any suitable configuration, in the embodiment shown in FIG. 1, the housing 12 includes first and second housing portions 16 and 18, respectively, that are connected together, and a cover plate 20 that is attached to the housing portions 16 and 18.

The housing portions 16 and 18 may be attached together in any suitable manner, such as with an adhesive or fasteners. Alternatively or supplementally, the housing portions 16 and 18 may be configured to snap fit together. Similarly, the cover plate 20 may be attached to the housing portions 16 and 18 in any suitable manner, such as described above with respect to the housing portions 16 and 18.

Referring to FIGS. 1 through 4, the outlet 10 further includes multiple vanes 22 that are pivotally attached to the housing 12. In the embodiment shown in the figures, for example, each vane 22 includes a projection, such as a pivot pin 24, disposed at each end of the vane 22. The pivot pins 24 are inserted through apertures 26 formed in the housing portions 16 and 18, such that the vanes 22 are pivotable with respect to the housing 12. Each vane 22 also includes an additional projection, such as connector pin 28, formed on a rear portion of the vane 22. While the connector pins 28 may have any suitable configuration, in one embodiment of the invention, each connector pin 28 includes a pin body 29 and an enlarged head 30 on the pin body 29.

A connecting member or link 32 is attached to the vanes 22 for pivoting the vanes 22 in unison. The link 32 includes multiple apertures or holes 34, and the link 32 is press-fit onto the connector pins 28 such that each connector pin 28 is received in a respective hole 34.

In accordance with the invention, the link 32 comprises a relatively soft material such that the link 32 may be easily press-fit onto the connector pins 28. More specifically, the link 32 may be made of a soft, rubbery material having a Shore A scale hardness in the range of 40 to 80, and preferably in the range of 42 to 72. In one embodiment of the invention, for example, the link 32 comprises a synthetic elastomer, such as neoprene, silicone or urethane. Other suitable materials include polybutadiene (butyl rubber), thermoplastic olefin and rubber.

Advantageously, such materials have sufficient elastic memory such that the link 32 may be configured to squeeze each connector pin 28, after being forced over the enlarged heads 30, to provide a desired frictional engagement between the link 32 and the vanes 22. As a result, a desired operational effort for pivoting the vanes 22 may be easily achieved. Furthermore, the operational effort may be easily varied by varying the thickness of the link 32 and/or by varying the diameter of the holes 34.

While the link 32 may have any suitable shape and size, in the embodiment shown in the figures, the link 32 has an elongated body 36 and multiple projections 38 extending from the elongated body 36. Furthermore, in one embodiment of the invention, the link 32 has a thickness in the range of 2 to 4 millimeters.

The outlet 10 may be manufactured in any suitable manner and may comprise any suitable materials. For example, the housing portions 16 and 18, the cover plate 20 and the vanes 22 may be made of an injection molded thermoplastic material, such as polypropylene. In another embodiment of the invention, each vane 22 comprises acrylonitrile butadiene styrene. The link 32 may be formed using any suitable molding process, and may comprise any suitable material, such as any of the soft, rubbery materials described above in detail.

Figure 5:
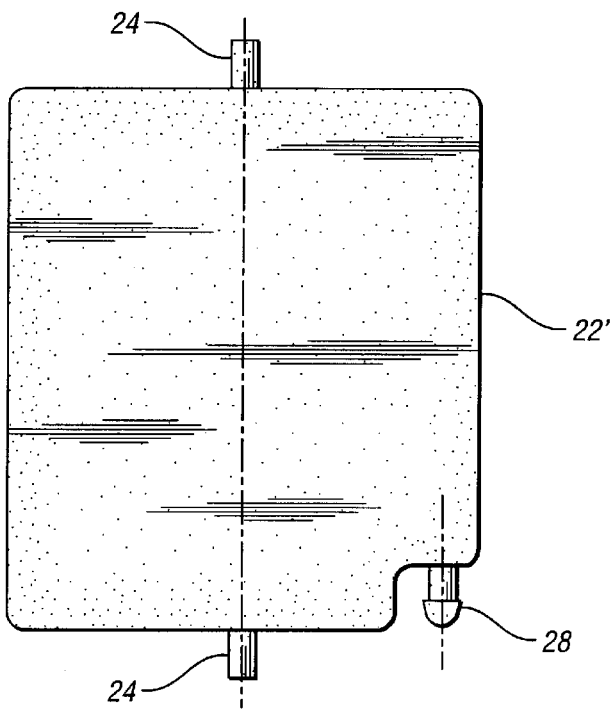
FIG. 5 is a top view of an alternate embodiment of a vane.
Figure 6:
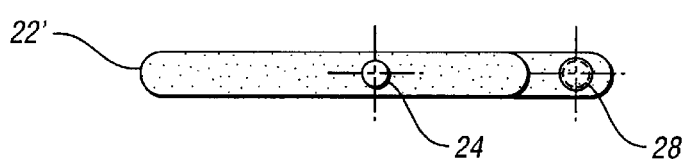
FIG. 6 is a side view of the vane of FIG. 5.

It should be understood that an outlet according to the invention may include one more links that are attached to any suitable number of vanes. Furthermore, each link and each vane may have any suitable configuration to facilitate interconnection of these components. FIGS. 5 and 6, for example, show a vane 22' that is configured for side attachment with a link 32. As another example, each vane may be provided with two connector pins, one at each end for instance, such that each vane may be attached to two links 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An outlet for a climate control system, the outlet comprising:

a support member;

multiple vanes pivotally connected to the support member; and a link attached to the vanes such that the vanes are pivotable in unison, each vane having a projection, the link comprising a soft, rubbery material having a Shore A hardness in the range of 40 to 80 and elastic memory such that the link squeezes each projection to provide a desired frictional engagement between the link and the vanes.

2. The outlet of claim 1 wherein the support member comprises a housing.

3. The outlet of claim 1 wherein the link comprises a synthetic elastomer.

4. The outlet of claim 1 wherein the link comprises neoprene.

5. The outlet of claim 1 wherein the link comprises silicone.

6. The outlet of claim 1 wherein the link comprises polybutadiene.

7. The outlet of claim 1 wherein the link comprises a thermoplastic urethane.

8. The outlet of claim 1 wherein the link comprises a thermoplastic olefin.

9. The outlet of claim 1 wherein the link has a Shore A hardness in the range of 42 to 72.

10. The outlet of claim 1 wherein the link has a Shore A hardness in the range of 50 to 55.

11. The outlet of claim 1 wherein each vane has a pin, and the link includes multiple holes that receive the pins, and wherein the link has elastic memory such that the link squeezes each pin to provide a desired frictional engagement between the link and the vanes.

12. An outlet for a climate control system, the outlet comprising:

a housing;

multiple vanes pivotally connected to the housing, each vane having a pin; and a link having multiple holes and being press-fit onto the pins such that each pin is received in a respective hole, the link being configured to pivot the vanes in unison, the link further comprising a synthetic elastomer having a Shore A hardness in the range of 42 to 72 and elastic memory such that the link squeezes each pin to provide a desired frictional engagement between the link and the vanes.

* * * * *